United States Patent

Forssén et al.

[11] Patent Number: 5,615,409
[45] Date of Patent: Mar. 25, 1997

[54] METHOD AND APPARATUS FOR TRANSMITTING AND RECEIVING SIGNALS USING TWO CLASSES OF CHANNELS

[75] Inventors: Ulf Forssén, Saltsjö-Boo; Björn Gudmundson, Sollentuna, both of Sweden

[73] Assignee: Telefonaktiebolaget LM Ericsson, Stockholm, Sweden

[21] Appl. No.: 533,104

[22] Filed: Sep. 25, 1995

Related U.S. Application Data

[63] Continuation of Ser. No. 126,558, Sep. 27, 1993, abandoned.

[51] Int. Cl.$^6$ ........................................ H04Q 7/30
[52] U.S. Cl. ........................ 455/33.1; 455/33.3; 455/54.1; 379/60
[58] Field of Search ........................ 455/25, 33.1, 33.2, 455/33.3, 33.4, 34.1, 53.1, 54.1, 56.1; 379/59, 60; 342/373, 383

[56] References Cited

U.S. PATENT DOCUMENTS

| | | | |
|---|---|---|---|
| 4,338,605 | 7/1982 | Mims | 342/373 |
| 4,575,724 | 3/1986 | Wiener | 342/383 |
| 4,723,266 | 2/1988 | Perry | 455/33 |
| 4,780,721 | 10/1988 | Dobson | 342/178 |
| 4,800,390 | 1/1989 | Searle | 342/383 |
| 5,021,801 | 6/1991 | Smith et al. | 455/56.1 X |
| 5,117,238 | 5/1992 | Silverstein et al. | 342/373 |
| 5,122,732 | 6/1992 | Engeler et al. | 324/77 E |
| 5,193,109 | 3/1993 | Lee . | |
| 5,212,805 | 5/1993 | Comroe et al. . | |
| 5,212,830 | 5/1993 | Miller . | |
| 5,230,081 | 7/1993 | Yamada et al. . | |
| 5,276,907 | 1/1994 | Meidan | 455/56.1 X |
| 5,327,576 | 7/1994 | Uddenfeldt et al. . | |
| 5,504,937 | 4/1996 | Kangas | 455/33.3 |

FOREIGN PATENT DOCUMENTS

| | | |
|---|---|---|
| 9216061 | 3/1991 | WIPO . |

OTHER PUBLICATIONS

Swales et al., "Multi-Beam Adaptive Base Station Antennas for Cellular and Mobile Radio Systems", Mobile Radio & Personal Communication Conf. pp. 341–348, Dec. 1989.

L. E. Brennan et al., "An Adaptive Array Signal Processing Algorithm for Communications", IEEE Transactions on Aerospace and Electronic Systems, vol. AES–18, No. 1, Jan. 1982, pp. 124–130.

William F. Gabriel, "Adaptive Processing Array Systems", *Proceedings of IEEE*, vol. 80, No. 1, Jan. 1992.

Wolfgang H. Kummer, "Basic Array Theory", *Proceedings of The IEEE*, vol. 80, No. 1, Jan. 1992.

Sören Anderson, "An Adaptive Array for Mobile Communication Systems", *IEEE Transactions on Vehicular Technology*, vol. 40, No. 1, pp. 230–236, Feb. 1991.

Jack H. Winters, "Optimum Combining in Digital Mobile Radio with Cochannel Interference", *IEEE Transactions on Vehicular Technology*, vol. VT–33, No. 3, pp. 144–155, Aug. 1994.

Seungwon Choi et al., "Adaptive Antenna Array Utilizing the Conjugate Gradient Method for Multipath Mobile Communication", *Signal Processing*, vol. 29, No. 3, pp. 319–332, Dec. 1992.

Appendix to Request of Spatial Communications, Inc., for a Pioneer's Preference in the Licensing Process for Personal Communication Services: Implementing SDMA in the PCS Environment, Technical and Economic Factors, 4 May 1992.

Appendix A — Spatial Communications, Inc. 4 May 1992.

*Primary Examiner*—Edward F. Urban
*Attorney, Agent, or Firm*—Burns, Doane, Swecker & Mathis

[57] ABSTRACT

A method and apparatus for transmitting and receiving signals in a base station with an antenna array in a cellular communication system. The available communication channels are divided into a plurality of classes. The base station transmits signals to the mobile station in a first class of channels in a wide antenna lobe. The position of a mobile station can then be determined from signals received at the base station from the mobile station. After the position of the mobile station has been determined, the base station can transmit signals to and receive signals from the mobile station in a second class channel with a narrow antenna lobe.

21 Claims, 5 Drawing Sheets

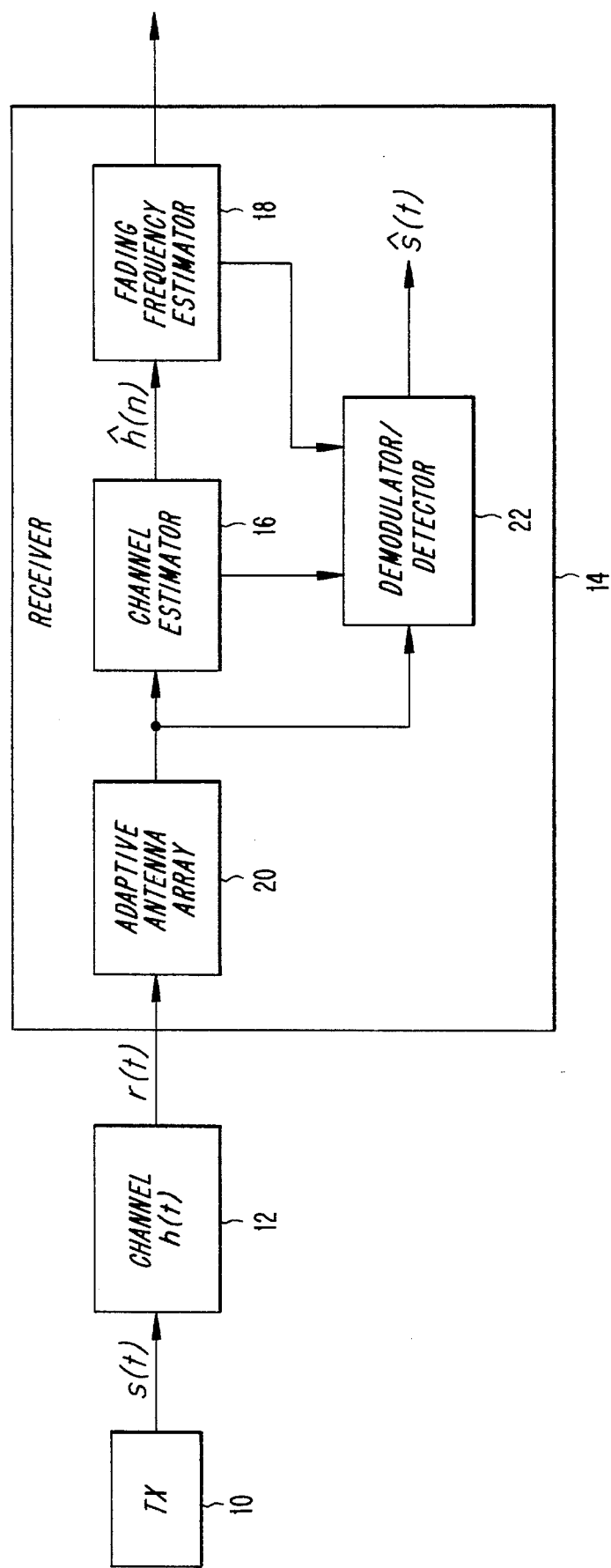

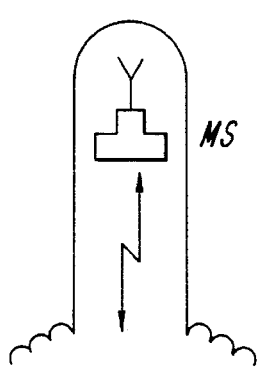
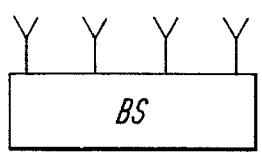
Fig. 7(a)
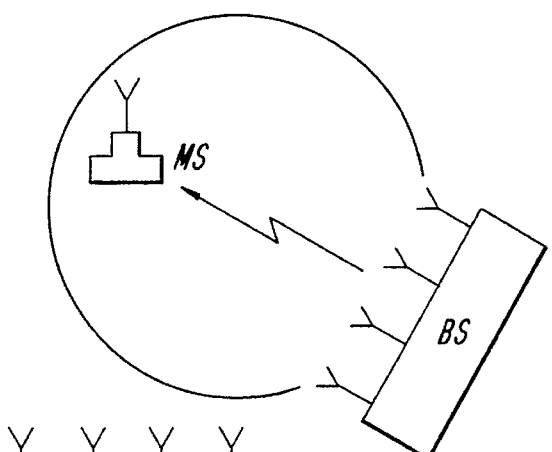
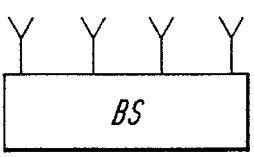
Fig. 7(b)
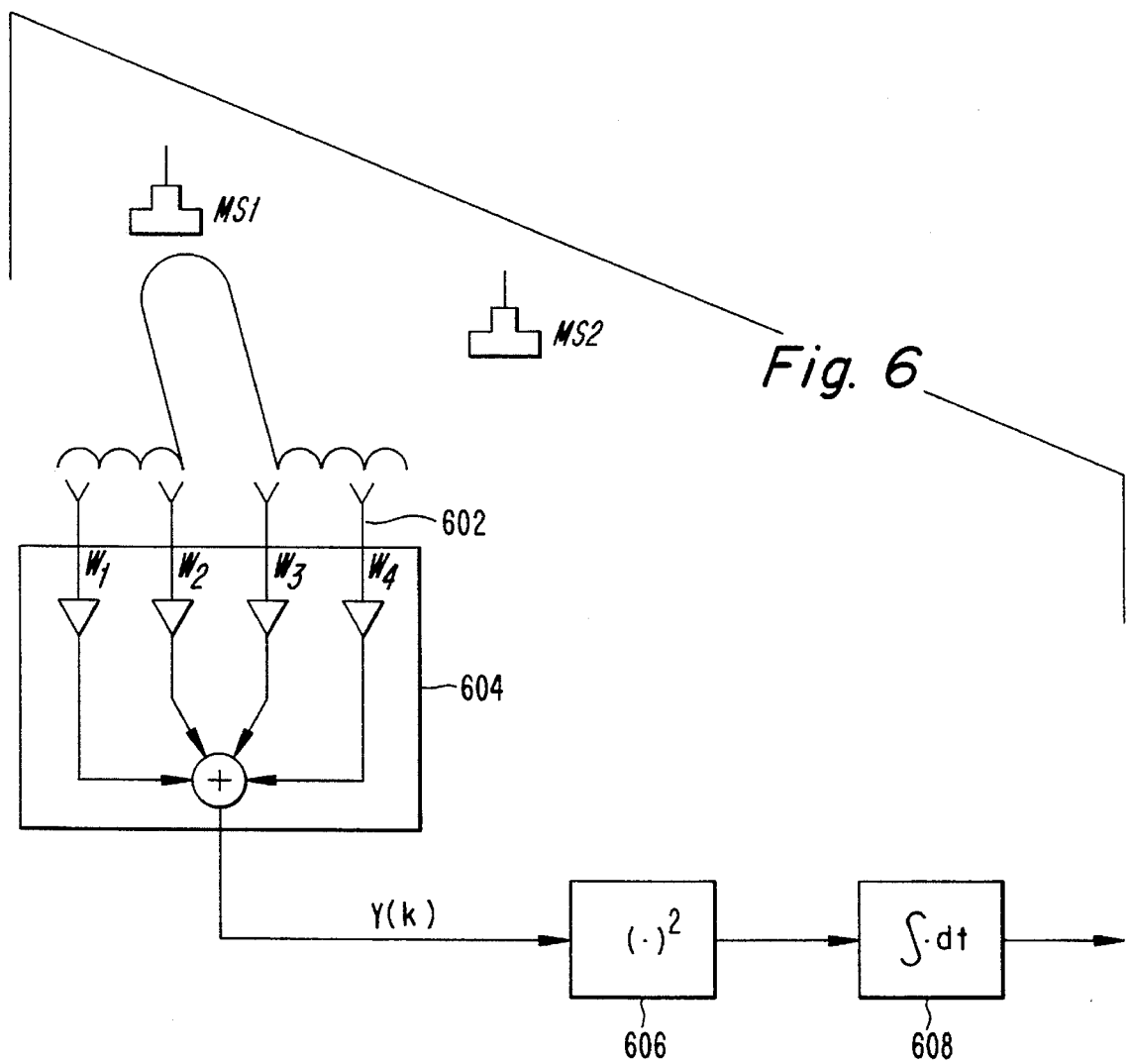
Fig. 6

METHOD AND APPARATUS FOR TRANSMITTING AND RECEIVING SIGNALS USING TWO CLASSES OF CHANNELS

This application is a continuation of application Ser. No. 08/126,558, filed Sep. 27, 1993, now abandoned.

FIELD OF THE INVENTION

The present invention relates to a cellular communication system with adaptive antenna arrays, and more specifically to a cellular communication system which uses both wide adaptive antenna lobes and narrow adaptive antenna lobes for communication between base stations and mobile stations.

BACKGROUND OF THE INVENTION

The cellular industry has made phenomenal strides in commercial operations in the United States as well as the rest of the world. Growth in major metropolitan areas has far exceeded expectations and is outstripping system capacity. If this trend continues, the effects of rapid growth will soon be achieved in the smallest markets. Innovative solutions are required to meet these increasing capacity needs as well as to maintain high quality service and avoid rising prices. Furthermore, as the number of cellular users increases, the problems associated with co-channel interference become of increased importance.

Current digital cellular systems employ base stations which separate mobile signals using time and frequency orthogonality. Signals from a mobile propagate to a base station and the signals are received in a single or sometimes double antenna. The receiver processes the signal using time and frequency orthogonality to separate signals from different users. It is then possible to equalize and detect the signals. While techniques such as frequency hopping and advanced coding techniques provide ways for lowering co-channel interference, they are inherently limited by the available frequency spectrum. However, the use of the directional sensitivity of adaptive antennas offers a new way of reducing co-channel interference. An adaptive antenna consists of an array of spatially distributed antennas. Impinging on the array are signals from several transmitters. By properly combining the antenna outputs, it is possible to extract individual signals from the received superposition, even if they occupy the same frequency band. It is then possible to distinguish between spatially separated users by using narrow adaptive antenna lobes. This can be viewed as a way to utilize orthogonality in the spatial dimension.

Current digital cellular systems also employ base stations which use base antennas with wide antenna lobes, i.e., approximately 60°, 120° or 360°. The base station receives signals from all mobile stations within the lobe. It is hence not necessary to know the position of the mobile station. However, it is not possible to suppress mobiles transmitting from other angles. The use of narrow adaptive antenna lobes requires that the position or more exactly, the best spatial filters for reception/transmission to and from the mobile station be known. This implies that the spatial filters of the mobile must be measured for each new call and after each handover between base stations.

This measurement problem can be easily solved in many applications. However, the problem is much more important in cellular mobile applications where the mobile stations change position and where communication channels fade quickly. Furthermore, existing standards such as the GSM standard often assume that a wide antenna lobe is used so that valuable information can be sent directly to mobile stations with unknown positions. This implies that special care must be taken so that information is not lost during the training of the adaptive antennas. Another consideration is the linking to a channel, i.e., the fact that a mobile can be assigned to one of a number of time and/or frequency orthogonal channels. A new mobile may not be appropriate for a specific channel since, for example, it is close to an old mobile on the same channel. There is hence a desire to first measure, without disturbing any traffic, and then to link the mobile to an appropriate channel. In other words, one should maximize the spatial orthogonality.

Another important consideration is handover measurements. There is a desire to have some channels transmitted in a wide lobe so that the mobile station can measure the signal strength of the signal from the base stations.

SUMMARY OF THE DISCLOSURE

It is an object of the present invention to provide a system wherein mobile stations with known and unknown positions can be used in the same system while the knowledge about the mobile's position at the same time can be utilized to reduce interference and increase system capacity. This object of the present invention is accomplished by using antenna arrays and by dividing the available traffic channels into a plurality of classes.

One embodiment of the present invention discloses a method of transmitting and receiving signals in a base station with an antenna array in a cellular communication system. First, the available communication channels are divided into a plurality of classes. The base station then transmits signals to mobile stations in a first class of channels with a wide antenna lobe. The position of a mobile station can then be determined from signals received at the base station from the mobile station. After the position of the mobile station has been determined, the base station can transmit signals to and receive signals from the mobile station in a second class of channels with a narrow antenna lobe.

BRIEF DESCRIPTION OF THE DRAWINGS

The present invention will now be described in more detail with reference to preferred embodiments of the present invention, given only by way of example, and illustrated in the accompanying drawings in which;

FIG. 1 illustrates a block diagram of the relationship between the transmitter and the receiver;

FIG. 6 illustrates a block diagram of one embodiment of a part of the present invention;

FIG. 7(a)–(b) illustrates another antenna arrangement according to one embodiment of the present invention.

DETAILED DESCRIPTION

Figure 2A:
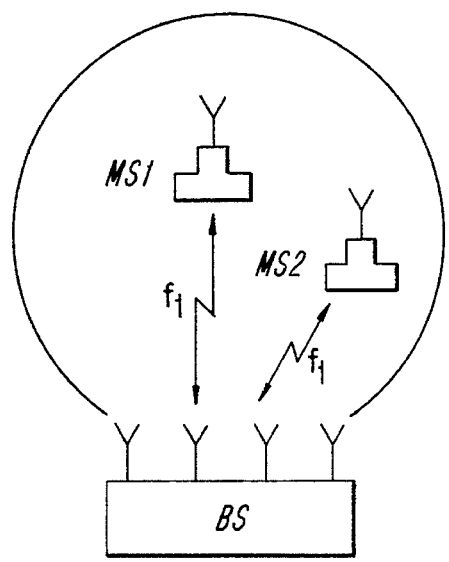
FIGS. 2(a)–(b) illustrates one antenna arrangement according to one embodiment of the present invention.

While the following description is in the context of cellular communication systems involving portable or mobile radio telephones and/or personal communication networks and a plurality of base stations, it will be understood by those skilled in the arts that the present invention may be applied to other communications applications.

FIG. 1 illustrates an overview picture of the link between a transmitter 10 and a receiver 14. The transmitter and receiver are located in both the mobile station and the base stations, however for this discussion the transmitter 10 is in the mobile station and the receiver 14 is located at the base station. The transmitter 10 sends a signal to the receiver 14 through a channel 12. The channel 12 is considered to be a linear transfer function with an impulse response h(t) which creates all the variations and phase and signal strength between the transmitter and the receiver. The transmitted signal s(t) is affected by the channel impulse response h(t) to form a received signal r(t). The signal r(t) is received by the receiver 14 through an adaptive antenna array 20 which feeds the received signal into a channel estimator 16 which calculates a discrete approximation to h(t) called h(n). The discrete approximation h(n) is then fed into the fading frequency estimator 18 which produces an estimate of the doppler frequency for the mobile station. The received signal is also feed into a demodulator/detector 22 which uses the channel estimate and a doppler frequency estimate to demodulate and detect the signal ŝ(t).

According to one embodiment of the present invention, the number of available traffic channels are divided into a plurality of groups or classes, for instance, two. According to one embodiment of the present invention, the first class of channels has a disturbance situation so that the base station can receive signals using wide antenna lobes and transmit signals to the mobile station using a wide antenna lobe. The second class of channels has a disturbance situation so that the base station must transmit signals using narrow antenna lobes in order to obtain acceptable quality. The difference between the channel classes is that a narrow lobe channel where the base station transmits signals in a narrow antenna lobe has a significantly higher spectral efficiency. The higher spectral efficiency can typically be used to reduce the frequency reuse or to enable multiple spatial separated users to communicate over the same channel. Typically, the control channel and some of the traffic channels should be class one channels while most of the traffic channels should be class two channels. Furthermore, the class one channels should use the same reuse distance and receiver algorithms as are presently available today, while the class two channels can have a smaller reuse distance than the class one channels.

Figure 2B:
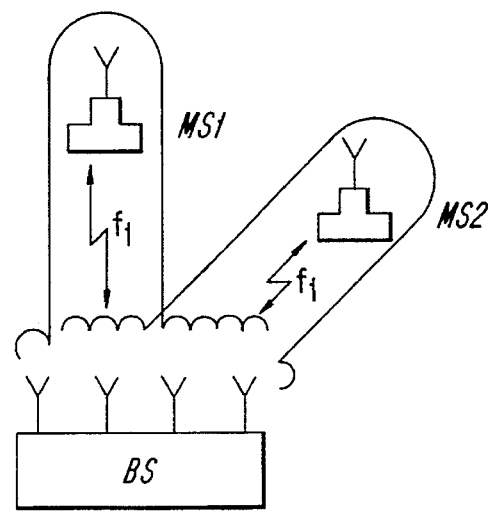

FIG. 2(a) illustrates a wide lobe channel. As is illustrated, the channel f1 is broadcast over a wide area so that a plurality of mobile stations can receive broadcast messages from the base station independently of their position. FIG. 2(b) illustrates a narrow lobe channel according to one embodiment of the present invention. As is illustrated, the channel f2 is broadcasted to a limited area using the spatial filters of the adaptive antenna array to limit the direction of channel f2. As a result, the channel f2 can be used by a plurality of mobile stations to transmit and receive individual messages, so long the mobile stations are not located in the same viewing.

According to one embodiment of the present invention, a base station transmits broadcast information, control messages, and paging messages on a wide lobe downlink channel. The base station also listens to all of the mobile stations in its assigned geographical area on a wide lobe uplink channel where, for example, mobile stations can send access requests to the base station. The base station collects the signals from the surrounding area at the antenna array. The collected signals are then entered into a signal processor which evaluates all of the individual signals to detect the presence of a mobile station and to measure the position of the mobile station. The base station can then use these position measurements to reduce the width of the antenna lobe used to send signals to particular mobile stations, i.e., assign the mobile station a class two channel, after the position of the mobile station is determined to be above a predetermined level of certainty.

Figure 3:
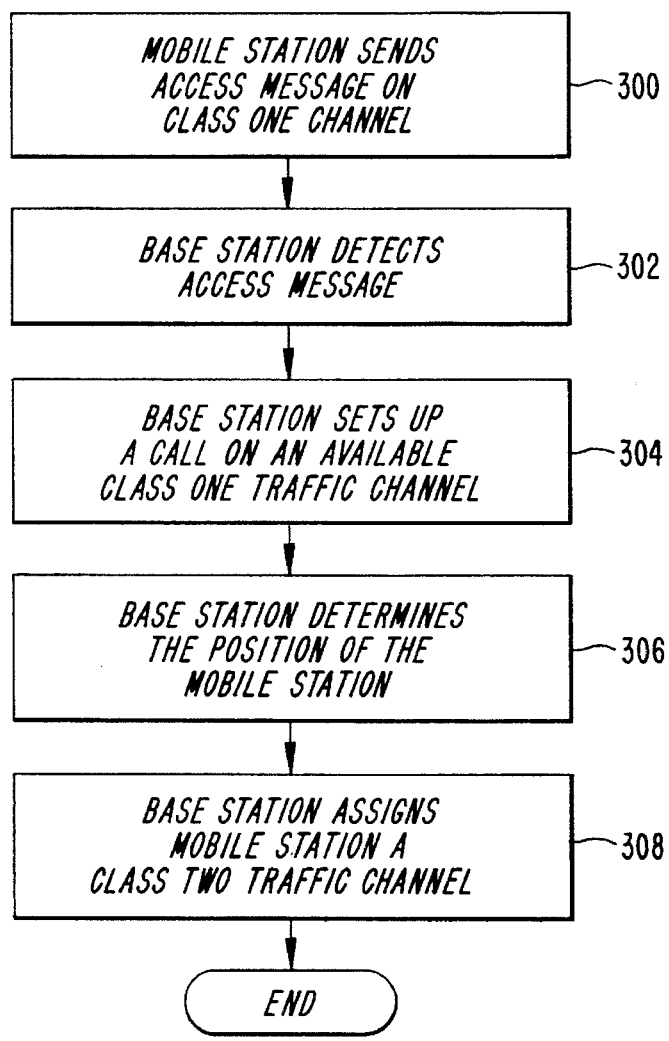
FIG. 3 is a flow chart of a call set up routine according to one embodiment of the present invention.

Class one channels are also used for setting up a new call and for handover between base stations. A typical call set up routine according to one embodiment of the present invention is illustrated in FIG. 3. First, a mobile station sends an access message on a random access control channel, which is a class one channel, to a base station in step 300. The message is detected and used as a training sequence for the antenna algorithm, in step 302, by demoting the vector signal from the antenna array at time K as $X(K)=[X_1(K) \ldots X_L(K)]^T$ where L is the number of array elements. The message sequence $\{d(K)\}_1^N$, can for example be used as the desired signal in a least-squares problem as follows. First, the linear combination of X(K) closest to d(K) is determined, in other words, the vector W is determined so that $(d_K - W^H X_K)^2$ is minimized. The determined vector, $W_o$, where $W_o = [W_1 \ldots W_2]^T$, can then be used to filter out the signal from the mobile. The base station then assigns the mobile station an available class one channel for the requested call in step 304. The position of the mobile station can then be measured while the mobile station uses the class one channel to transmit data.

Figure 4:
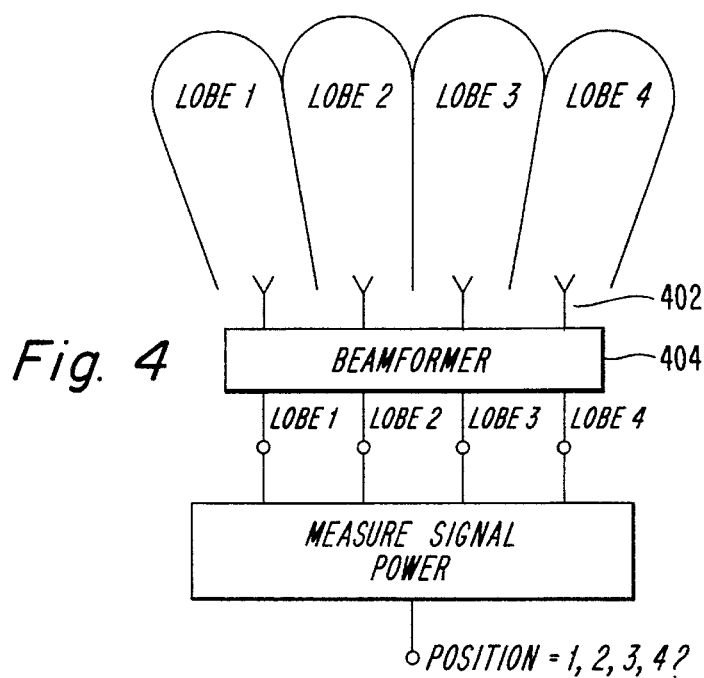
FIG. 4 illustrates an example of beam-forming according to one embodiment of the present invention.
Figure 5:
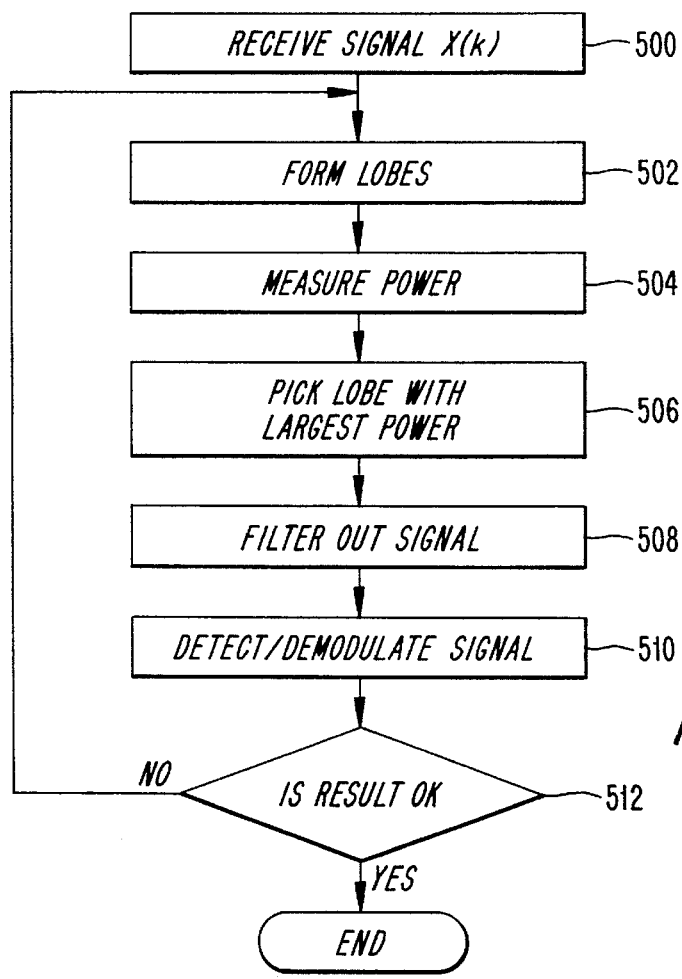
FIG. 5 illustrates a flow chart for detecting and demodulating a signal according to one embodiment of the present invention.

The position of the mobile station can, for example, be characterized by the previously determined vector $W_o$. It is also possible to determine a direction of arrival of the signal from the mobile station using well known algorithms such as beam-forming, MUSIC, ESPRIT, and WSF. An example of beam-forming is illustrated in FIG. 4. The signal from a mobile station is received in a number of lobes, for example, four lobes. The beam-forming could, for example, be done with four separate directional antennas 402, with a Butler beamformer 404 on the radio frequency signal or at base band with digital filters. FIG. 5 illustrates one process for detecting and demodulating a signal from a mobile station. In step 500, a signal from a mobile station is received at the antenna array 402. Lobes are then formed in step 502 and the output power from each of the lobes is measured in step 504. The lobe with the largest measured power is then selected as the best lobe in step 506. The lobe number, i.e., 1,2,3,4, is then a characterization of the position of the mobile station. The desired signal is then filtered out in step 508 and the signal is detected and demodulated in step 510. The resulting signal is then checked to see if it is useable, for example, has sufficient signal strength, in step 512. If the signal is not useable, the selected lobe is marked as used in step 514 and the routine returns to step 502.

FIG. 6 illustrates one method for measuring the power of signals received from mobile station MS1. The array of antennas 602 receive a plurality of signals, some of which are from MS1. The plurality of signals are then filtered in a spatial filter 604. The spatial filtering can reduce interference from other directions in the uplink direction. It can also reduce the downlink disturbance from the base station towards the mobile station. In the uplink direction, the weights of the spatial filter $W_1$, $W_2$, $W_3$, and $W_4$ are chosen so that the filtered signal Y(K) consists solely of the signals received from the mobile station MS1. In the downlink direction, the weight of the spatial filter are chosen so that all of the signals for MS1 reach MS1 without disturbing MS2. The filtered signal Y(K) is then squared in a squaring means 606 to produce the momentaneous power of the mobile station MS1. The momentaneous power is then averaged in time in an integrator 408 to produce the time averaged power of the mobile station MS1. Returning to FIG. 3, as soon as the position and power level of the new mobile are determined in step 306, the mobile station can then be assigned a class two channel in step 308.

Traffic to and from mobiles with known positions can be directed in specific directions using narrow antenna lobes. As a result, interference is reduced and multiple mobiles can use the same frequency channel. According to one embodiment of the present invention, a single frequency channel can have up to 5 users at the same time but is not limited thereto. A mobile that wants to access an Advance Mobile Phone Service System (AMPS) type of Frequency Division Multiple Access (FDMA) system would typically send its access request or call setup request to a base station using a widelobe channel as indicated in FIG. 2(a). The signal is processed by the base station and the mobile's position can then be measured. The mobile is then instructed to transmit and receive on a narrow band channel as illustrated in FIG. 2(b).

An active mobile in a American Digital Cellular (ADC) type Time Division Muldtiple Access System system would, as illustrated in FIG. 7(a)–(b), typically use one time slot for transmission to the base station and another time slot for reception from the base station. This transmission would typically use narrow lobe channels with high spectral efficiency as illustrated in FIG. 7a. The mobile is then free for the rest of the time slots to listen for information broadcasted from base stations in the general vicinity on widelobe channels as illustrated in FIG. 7b.

Figure 8:
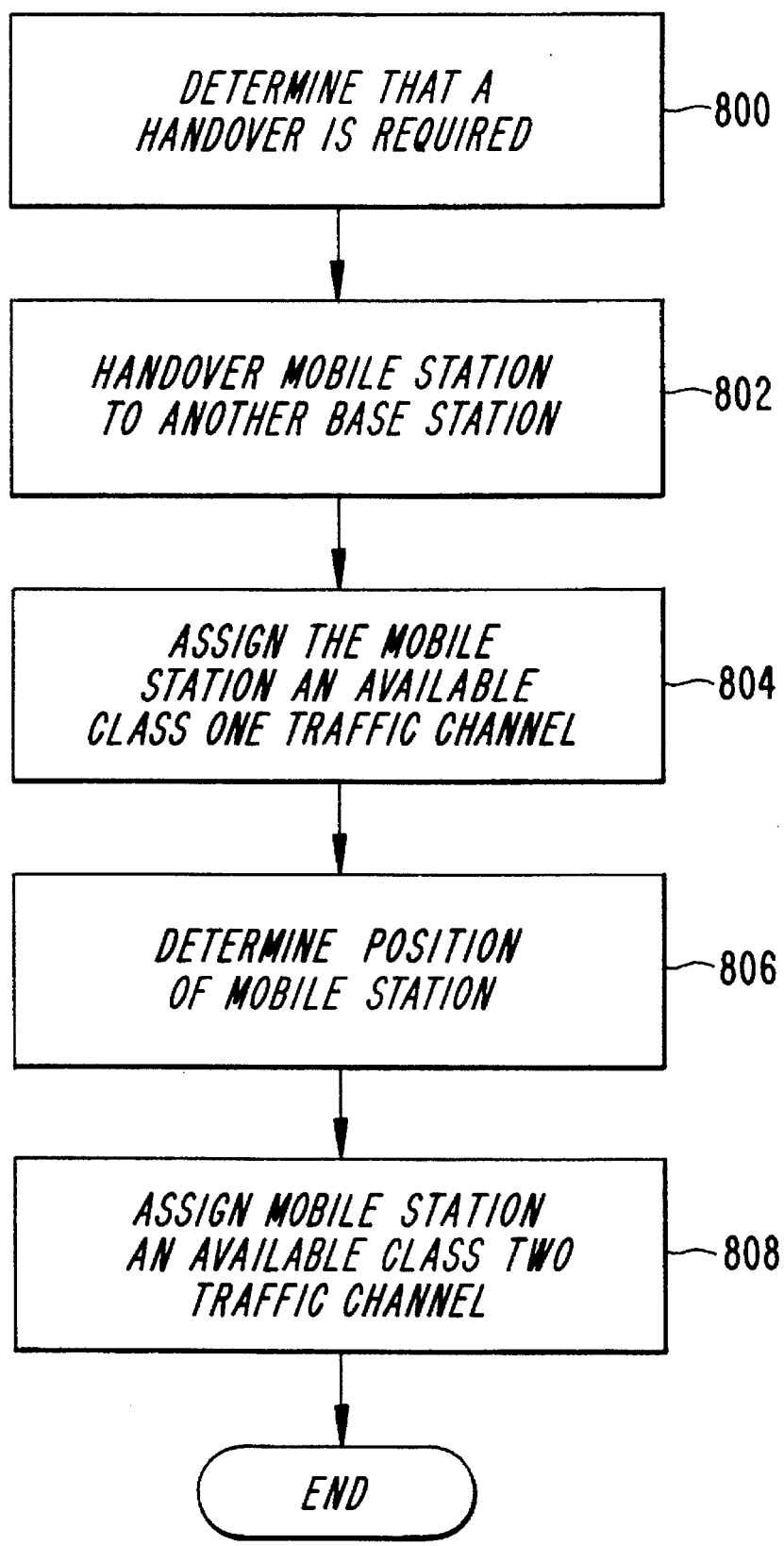
FIG. 8 is a flow chart of a handover routine between base stations according to one embodiment of the present invention.

A typical call handover routine according to one embodiment of the present invention is illustrated in FIG. 8. When a first base station determines that a handover is required using one of the methods that are well known to one of ordinary skill in the art in step 800, the first base station hands off the mobile station to a second base station in step 802. The second base station then assigns the mobile station an available class one channel in step 804 so that the mobile station can continue the call in progress. The position of the mobile station is then gradually determined by either the base station or the mobile station in step 806. The second base station the assigns the mobile station an available class two traffic channel in step 808. Furthermore, according to one embodiment of the present invention, while the mobile station is transmitting on a class two channel, the mobile station can make handover measurements by monitoring the class one channels as long as the signals are separated in time.

According to another embodiment of the present invention, the class two channels have antenna lobes with variable widths, wherein all of the widths of the antenna lobes of class two channels are less than the width of antenna lobes of class one channels. As a result, as the position of a mobile station is gradually determined, the base station can gradually reduce the antenna lobe width of the class two channel assigned to the mobile station. As a result, the signal quality of the mobile station can be gradually increased.

It would be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

We claim:

1. A method for transmitting and receiving signals at a base station with an antenna array in a cellular communication system, comprising the steps of:

dividing available communication channels into a plurality of classes;

transmitting signals to a plurality of mobile stations in a first class of channels with a wide antenna lobe created by said antenna array, wherein said first class of channels is used to transmit broadcast information to an entire cell and to receive initial access signals from mobile stations, said first class of channels is also used for enabling mobile stations to measure the downlink signal strength transmitted from adjacent base stations and is used for handover access during handovers between base stations;

determining position of a first mobile station from signals received from said first mobile station;

transmitting signals to said first mobile station in a second class of channels with a narrow antenna lobe created by said antenna array when the position of said mobile is determined; and receiving signals from said first mobile station with adjustable lobe widths on both channel classes.

2. A method according to claim 1, wherein the position of said first mobile station is determined by:

measuring the power level of signals received from said first mobile station; and determining a proper antenna lobe for a newly connected mobile station.

3. A method according to claim 1, wherein said base station assigns said mobile station to a channel in said second class of channels after the position of said mobile station is determined to be above a predetermined level of certainty.

4. A method according to claim 1, further comprising the steps of:

transmitting and receiving signals at a mobile station on a channel in said second class of channels; and performing handover measurements of signals received at said mobile station on said first class of channels.

5. A method according to claim 1, wherein at least one control channel and a minority of traffic channels belong to the first class of channels.

6. A method according to claim 1, wherein said second class of channels has a smaller reuse distance than said first class of channels.

7. A method according to claim 1, wherein said second class of channels has more than one user for each channel.

8. A method according to claim 1, wherein said second class of channels has variable antenna lobe widths.

9. A method according to claim 8, wherein the base station gradually reduces the antenna lobe width of a second class channel assigned to a mobile station as the base station gradually determines the position of said mobile station.

10. A communication system with at least one base station having an antenna array, comprising;

means for transmitting signals from a base station to a plurality of mobile stations on a plurality of classes of channels;

means for receiving signals from a plurality of mobile stations at a base station on a plurality of classes of channels;

means for determining a position of a mobile station from said received signals, wherein said base station transmits signals in a first class of channels with a wide antenna lobe created by said antenna array and said base station transmits signals in a second class of channels with a narrow antenna lobe created by said antenna array when the position of said mobile station has been determined, wherein said first class of channels is used to transmit broadcast information to an entire cell and to receive initial access signals from mobile stations, said first class of channels is also used for enabling mobile stations to measure the downlink signal strength transmitted from adjacent base stations and is used for handover access during handovers between base stations.

11. A cellular communication system according to claim 10, wherein said first class of channels is used for handover between base stations.

12. A cellular communication system according to claim 11, wherein a mobile station contains means for transmitting and receiving signal on a channel in said second class of channels and means for measuring handover measurements on a channel in said first class of channels.

13. A cellular communication system according to claim 12, said mobile station further comprising means for transmitting and receiving signals on a channel in said first class of channels.

14. A cellular communication system according to claim 10, wherein said position determining means comprises:

means for determining a power level of a signal from said mobile station; and means for determining an antenna lobe for a said mobile station.

15. A cellular communication system according to claim 10, wherein said base station assigns said mobile station to a channel in said second class of channels after the position of said mobile is determined to be above a predetermined level of certainty.

16. A cellular communication system according to claim 10, wherein at least one control channel and a minority of traffic channels belong to the first class of channels.

17. A cellular communication system according to claim 10, wherein said second class of channels has a smaller reuse distance than said first class of channels.

18. A cellular communication system according to claim 10, wherein said second class of channels has more than one user for each channel.

19. A cellular communication system according to claim 10, wherein said second class of channels has variable antenna lobe widths.

20. A cellular communication system according to claim 19, wherein the base station gradually reduces the antenna lobe width of a class two channel assigned to a mobile station as the base station gradually determines the position of said mobile station.

21. A communication system according to claim 10, wherein mobile stations in traffic mode can be connected to a traffic channel belonging to either the first class or the second class of channels while the mobile stations simultaneously use first class channels to extract downlink control messages and to perform signal strength measurements on adjacent base stations.

* * * * *